UNITED STATES PATENT OFFICE.

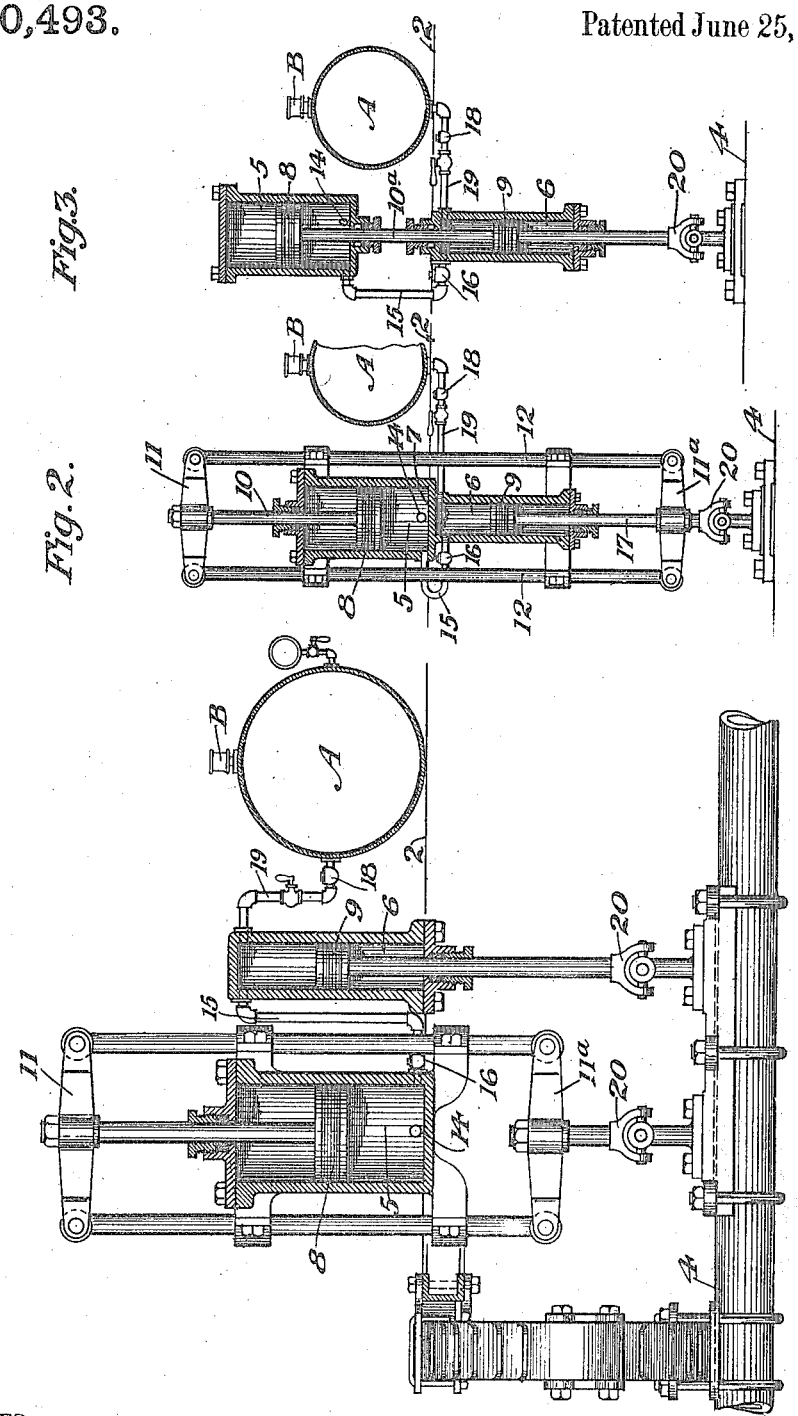

JOHN J. CAMPODONICO, OF STOCKTON, CALIFORNIA.

VEHICLE AIR-CUSHION COMPRESSOR.

1,270,493. Specification of Letters Patent. Patented June 25, 1918.

Application filed April 13, 1915. Serial No. 21,035.

*To all whom it may concern:*

Be it known that I, JOHN J. CAMPODONICO, a citizen of the United States, residing at Stockton, in the county of San Joaquin and State of California, have invented new and useful Improvements in Vehicle Air-Cushion Compressors, of which the following is a specification.

My invention relates to a device and mechanism which I term a "vehicle air cushion compressor".

It consists in combination with the bearing wheel axle, the body and springs of the vehicle, of cylinders disposed in pairs carried by the body of the vehicle, and pistons movable therein and connected with the axle of the vehicle, a receiver, and connections between said receiver and the smaller of the cylinders of each pair whereby the pressure of the air is compounded in passing through the cylinders and delivered into the receiver.

It also comprises details of construction which will be more fully explained by reference to the accompanying drawings, in which—

Figure 1 is a view illustrating my apparatus comprising cylinders side by side with their connections.

Fig. 2 represents the cylinders in block and in line.

Fig. 3 shows the cylinders in line with a piston rod common to both pistons.

For the purpose of forming an air cushion, I have shown a tank or receiver A into which air may be compressed; this receiver having an outwardly opening pressure valve B through which any excess of pressure may be allowed to escape. This receiver is charged by an apparatus carried upon the frame or body 2 of the vehicle to which it is applied, this vehicle being mounted upon wheels having an axle 4.

In Fig. 2 I have shown two cylinders 5 and 6. These cylinders are preferably made in a single block or casting having an intermediate head 7 common to both. The cylinder 5 is the primary cylinder and is larger than the cylinder 6. Within cylinder 5 is a piston 8 and within cylinder 6 is a piston 9. The block cylinder as formed is secured to the body or frame of the vehicle at any suitable point. I have shown but one of these contiguous to one side of the vehicle and secured to the body so that it may project up into the body or may be secured to the side thereof or to its frame. These cylinders being thus fixed to the body it will be obvious that they will partake of any movements of the body, this body being mounted upon springs of any usual or suitable construction so that in passing over rough places in the road the body will rise and fall with relation to the axle as the springs are compressed or expanded.

The piston 8 in the larger cylinder 5 has a piston-rod 10 extending through the head of the cylinder and connected with the center of a transverse bar 11. The ends of this bar, have connected with them rods 12, which pass down outside of the cylinder, and are connected through a cross head 11ª or equivalent devices with the axle 4, so that as the body moves up and down the piston will, by its comparatively stationary position within the cylinder, operate by the reciprocation of the cylinder about it. This reciprocation of the piston will draw air through a suitable check-valve, as at 14, into the cylinder below the piston, and when the piston returns within the cylinder it will force the air out through a pipe 15 and check-valve, as at 16, into the upper part of cylinder 6. This cylinder has its piston 9 connected by a piston-rod 17 with the axle 4, so that this piston will be moved within its cylinder by the same reciprocations which act upon the piston 8 through cross heads 11 and 11ª.

The air which is first partially compressed in the cylinder 5 will be transferred through the pipe 15 and check-valve 16 into the cylinder 6. Within this cylinder the movement of the piston 9 will further compress the air in a second stage and transfer it through a check-valve 18 and pipe 19 into the receiver A, as previously described. Thus any desired amount of air may be compressed into this receiver and up to the limit of this supply, a corresponding elasticity will be produced which will act upon the pistons of the cylinders, thus acting as a cushion to the movements of said pistons by the oscillations of the vehicle.

Fig. 1 shows a modification of my device in which the cylinders 5 and 6 are secured to the body of the vehicle side by side and in line above the axle. The piston 8 of the cylinder 5 is connected through the transverse bars 11 and 11ª with the axle 4 and the piston 9 of the cylinder 6 is in a similar manner connected with the axle 4, the two operating to force the air when moving in opposite directions. Connecting pipes between the two cylinders in this case will be disposed to conveniently accommodate the different positions of the cylinders.

In Fig. 3 the cylinders are cast separate and attached to the vehicle in vertical alinement, a piston rod 10ª extends through the two contiguous cylinder heads with suitable stuffing boxes, and both pistons are carried by the single rod which is connected with the vehicle axle by a universal joint 20; similar joints forming the connection in each of the modifications. The pipe connections and valves are similar.

Having thus described my invention, what I claim and desire to secure by Letters Patent is—

1. In an air compressor for vehicles, a pair of independent vertical cylinders of varying size connected to the vehicle body and each disposed completely exteriorly of the other and having a completely closed compression end, pistons, each piston having a rod in connection with the vehicle axle and but one of the rods being directly connected to said axle, a pipe leading from the compression end of the larger cylinder to the compression end of the smaller cylinder to conduct air compressed in the larger cylinder to the compression end of the smaller cylinder, a receiver, and means to conduct air from the compression end of the smaller cylinder into the receiver, the compression ends of the respective cylinders facing in opposite directions.

2. In an air compressor for vehicles, a pair of vertical cylinders arranged in end to end relation and connected to the vehicle body, said cylinders having a completely closed head common to each, a piston in each cylinder, a cross head connected to the outer end of each piston rod, rods connected to the ends of the cross heads and disposed exteriorly of the cylinders, means to connect one of the cross heads to the vehicle axle, a pipe connection between the compression ends of the cylinders extending across said head and leading into the cylinders on opposite sides of said head, a receiver, and a connection between the compression end of one cylinder and said receiver.

In testimony whereof I have hereunto set my hand in the presence of two subscribing witnesses.

JOHN J. CAMPODONICO.

Witnesses:
GEO. H. STRONG,
JOHN H. HERRING.

Copies of this patent may be obtained for five cents each, by addressing the "Commissioner of Patents, Washington, D. C."